United States Patent
Kervec et al.

(10) Patent No.: US 9,402,086 B2
(45) Date of Patent: Jul. 26, 2016

(54) METHOD FOR PROCESSING STEREOSCOPIC IMAGES AND CORRESPONDING DEVICE

(75) Inventors: Jonathan Kervec, Cesson-Sévigné (FR); Hassane Guermoud, Cesson-Sévigné (FR); Emmanuel Joly, Cesson-Sévigné (FR)

(73) Assignee: Thomson Licensing (FR)

( * ) Notice: Subject to any disclaimer, the term of this patent is extended or adjusted under 35 U.S.C. 154(b) by 1107 days.

(21) Appl. No.: 13/065,641

(22) Filed: Jun. 15, 2011

(65) Prior Publication Data

US 2011/0285815 A1    Nov. 24, 2011

(30) Foreign Application Priority Data

Apr. 9, 2010   (FR) ...................................... 10 52693

(51) Int. Cl.
*H04N 13/00*   (2006.01)
*H04N 19/577*   (2014.01)

(52) U.S. Cl.
CPC ......... *H04N 19/577* (2014.11); *H04N 13/0003* (2013.01)

(58) Field of Classification Search
CPC .................... H04N 19/00769; H04N 13/0239; H04N 13/0059; H04N 19/577; H04N 13/0003
USPC .......... 348/43, 441, 238; 375/240.12, 240.01
See application file for complete search history.

(56) References Cited

U.S. PATENT DOCUMENTS

| | | | |
|---|---|---|---|
| 5,699,443 A | 12/1997 | Murata et al. | |
| 8,339,441 B2* | 12/2012 | Yamada | 348/43 |
| 8,767,831 B2* | 7/2014 | Chen et al. | 375/240.16 |
| 2002/0159749 A1 | 10/2002 | Kobilansky | |
| 2004/0070556 A1 | 4/2004 | Weitbruch et al. | |
| 2004/0165110 A1* | 8/2004 | Peters et al. | 348/441 |
| 2004/0234143 A1* | 11/2004 | Hagai et al. | 382/238 |
| 2006/0159175 A1* | 7/2006 | De Haan | 375/240.16 |

(Continued)

FOREIGN PATENT DOCUMENTS

| | | |
|---|---|---|
| EP | 0896301 | 2/1999 |
| EP | 0915433 | 5/1999 |

(Continued)

OTHER PUBLICATIONS

Konrad et al., "Cancellation of Image Crosstalk in Time-Sequential Displays of Stereoscopic Video", IEEE Transactions on Image Processing, vol. 9, No. 5, May 2000, pp. 897-908.

(Continued)

*Primary Examiner* — Tung Vo
*Assistant Examiner* — Rowina Cattungal
(74) *Attorney, Agent, or Firm* — Jack Schwartz & Associates, PLLC

(57) ABSTRACT

The invention relates to a method for video processing of at least one image of a video sequence, said video sequence comprising a plurality of image pairs, each image pair comprising a first image and a second image said first and second images being intended to form a stereoscopic image. In order to reduce display defects, the method comprises a step of generation of at least a third image by motion compensated temporal interpolation from at least two of said second images.

14 Claims, 6 Drawing Sheets

(56) References Cited

U.S. PATENT DOCUMENTS

| | | | |
|---|---|---|---|
| 2007/0147502 A1* | 6/2007 | Nakamura | 375/240.12 |
| 2009/0027488 A1 | 1/2009 | Lee | |
| 2009/0219382 A1* | 9/2009 | Routhier | H04N 13/0029 348/43 |
| 2009/0316784 A1 | 12/2009 | Kervec et al. | |
| 2009/0316994 A1 | 12/2009 | Boughorbel | |
| 2010/0046615 A1 | 2/2010 | Chen et al. | |

FOREIGN PATENT DOCUMENTS

| | | |
|---|---|---|
| JP | H01316092 | 12/1989 |
| JP | H0865713 | 3/1996 |
| JP | H08149517 | 6/1996 |
| JP | 2008252731 | 10/2008 |
| JP | 4364287 | 11/2009 |
| JP | 201056694 | 3/2010 |
| JP | 201062695 | 3/2010 |
| JP | 2010056694 A * | 3/2010 |
| JP | 2011139222 | 7/2011 |
| NO | 985170 | 11/1998 |
| WO | WO03088682 | 10/2003 |

OTHER PUBLICATIONS

French Search Report dated Nov. 10, 2010.
Jia et al., "Stereoscopic video coding based on global displacement compensated prediction", Proceedings of the 2003 Joint Conference of the Fourth International Conference on Information, Communications and Signal Processing and Fourth Pacific-Rim Conference on Multimedia, Dec. 15, 2003, Singapore, Maylasia, pp. 61-65.

* cited by examiner

METHOD FOR PROCESSING STEREOSCOPIC IMAGES AND CORRESPONDING DEVICE

This application claims the benefit, under 35 U.S.C. §119 of FR Patent Application 1052693, filed 9 Apr. 2010.

1. SCOPE OF THE INVENTION

The invention relates to the domain of image or video processing and more specifically to the processing of three-dimensional (3D) images and/or video. The invention also relates to the domain of image interpolation with motion compensation.

2. PRIOR ART

Figure 1:
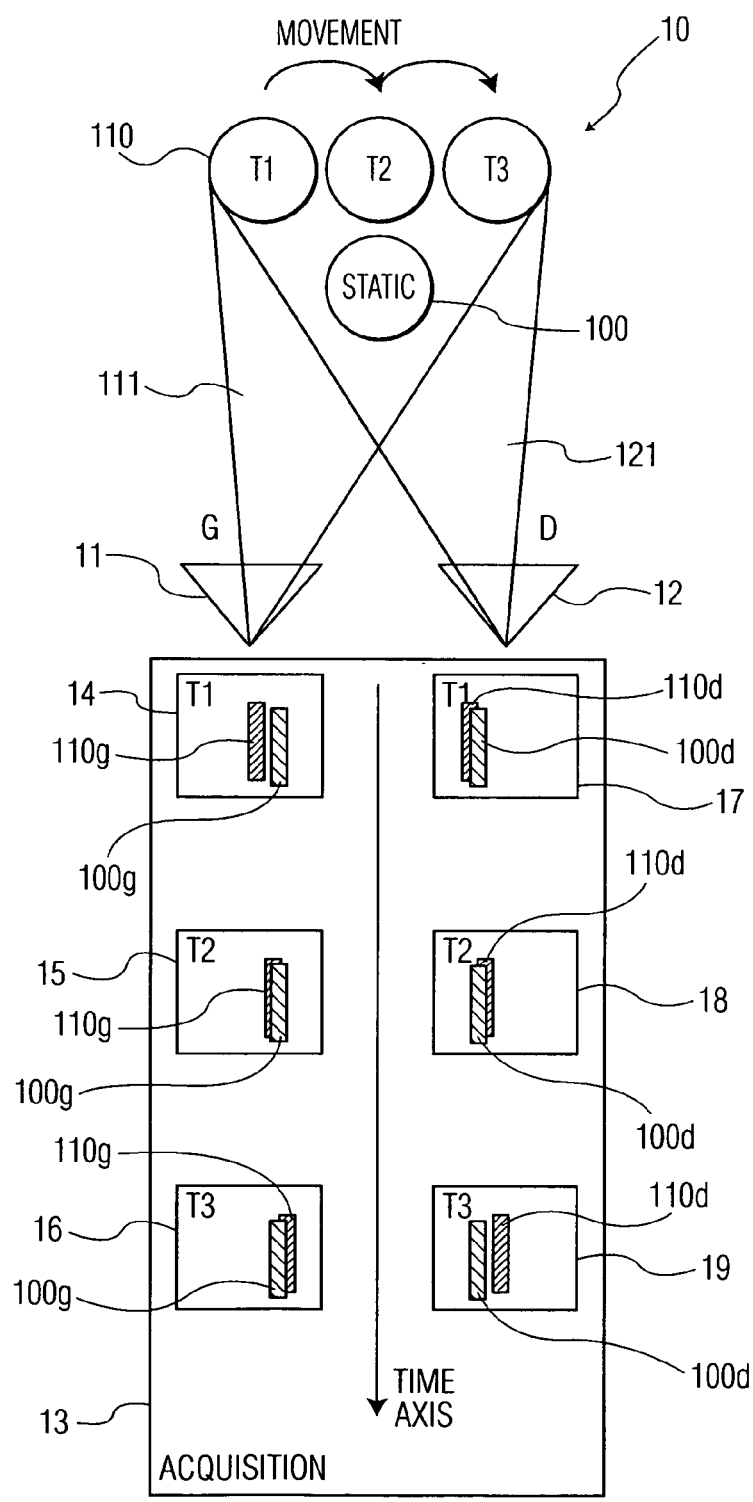

According to the prior art, one of the methods used in video processing to restore a perception of relief is stereoscopy. According to this method, two views of a same scene are recorded, with two different video cameras or two different still cameras, from two different viewpoints laterally offset with respect to one another. The capture of a same scene by two different cameras is shown in FIG. 1 according to a particular embodiment. The scene filmed by two cameras, called left camera G 11 and right camera D 12, is composed of two cylinders, the first 100 of these cylinders being static and the second 110 of these cylinders displacing according to a horizontal movement going from left to right to take-up three successive spatial positions at the times T1, T2 and T3. The left G 11 and right D 12 cameras are spaced from each other according to a predefined distance (for example 6.5 cm, distance corresponding to the average distance separating the eyes of an individual) and record the same scene according to two different viewpoints, respectively 111 and 121. Each of the cameras G 11 and D 12 film a video sequence composed of three images, each of the three images being captured respectively at the times T1, T2 and T3. The acquisition of this video sequence is represented in the timing diagram 13 of FIG. 1. The camera G 11 records three successive images 14, 15 and 16 respectively and the times T1, T2 and T3 and the camera D 12 records three successive images 17, 18 and 19 respectively at the same times T1, T2 and T3 as respectively the images 14, 15 and 16. The images 14, 15 and 16 will be called left images in the remainder of the description and the images 17, 18 and 19 will be called the right images. The left 14 and right 17 images are captured in a synchronized way and are representative of cylinders 100 and 110 at the time T1, the left images 15 and right images 18 are captured in a synchronized way and are representative of cylinders 100 and 110 at the time T2 and the left image 16 and right image 19 are also captured in a synchronized way and are representative of cylinders 100 and 110 at the time T3. The left 14 and right 17 images being captured by spatially offset cameras 11 and 12, the position of cylinders 100 and 110 represented in the left image 14 by cylinders 100g and 110g is not identical to the position of the same cylinders 100 and 110 represented in the right image 17 by cylinders 100d and 110d, the two images 14 and 17 being of identical dimensions (for example 1920× 1080 pixels in HD (High Definition) format). Differences between the positions of cylinders 100g and 110g on the one hand and the positions of cylinders 100d and 110d on the other hand also appear in the pair of images 15 and 18 taken at the time T2 and in the pair of images 16 and 19 taken at the time T3.

Each pair of left and right images, namely the left 14 and right 17 images at the time T1, the left 15 and right 18 images at the time T2 and the left 16 and right 19 images at the time T3, is intended to form a stereoscopic image restoring a three-dimensional rendering of the scene 10 at the times T1, T2 and T3 though the images 14 to 19 are captured in two dimensions. There are several techniques for displaying the image pairs 14/17, 15/18 and 16/19 enabling the restoration of stereoscopic images. One of these techniques consists in displaying alternately a left image then a right image, for example according to the following temporal sequence: 14-17-15-18-16-19. Such an alternating display of left and right images in time is known as temporal sequential displaying, a user desiring to see the rendering in 3D of images of the sequence having to wear specific glasses, for example active glasses for which the occultation of the left eye and the right eye are respectively synchronized with the displaying of right and left images on a LCD or plasma type display device for example.

Temporal sequential displaying, that is to say the successive displaying of a left image then a right image, leads to display defects due to the fact that the left and right images displayed successively in time were captured in a synchronized way, when areas of images captured reveal movements.

3. SUMMARY OF THE INVENTION

The purpose of the invention is to overcome at least one of these disadvantages of the prior art.

More specifically, the purpose of the invention is notably to reduce the defects of stereoscopic displaying of sequences comprising objects in movement.

The invention relates to a method for video processing of at least one video sequence, the video sequence comprising a plurality of image pairs, each image pair comprising a first image and a second image, the first and second images being intended to form a stereoscopic image. The method comprises a step of generation of at least one third image by motion compensated temporal interpolation from at least two of said second images.

According to a particular characteristic, the method comprises a step of estimation of a motion vector for each pixel of a plurality of pixels of the third image from at least two second images.

Advantageously, the method comprises a step of displaying of first and third images on a display device, the first and third images being respectively displayed sequentially.

According to a specific characteristic, the method comprises a step of generation of at least a fourth image by motion compensated temporal interpolation from at least two first images.

Advantageously, the method comprises a step of displaying third and fourth images on a display device, the third and fourth images being respectively displayed sequentially.

4. LIST OF FIGURES

Figure 2:
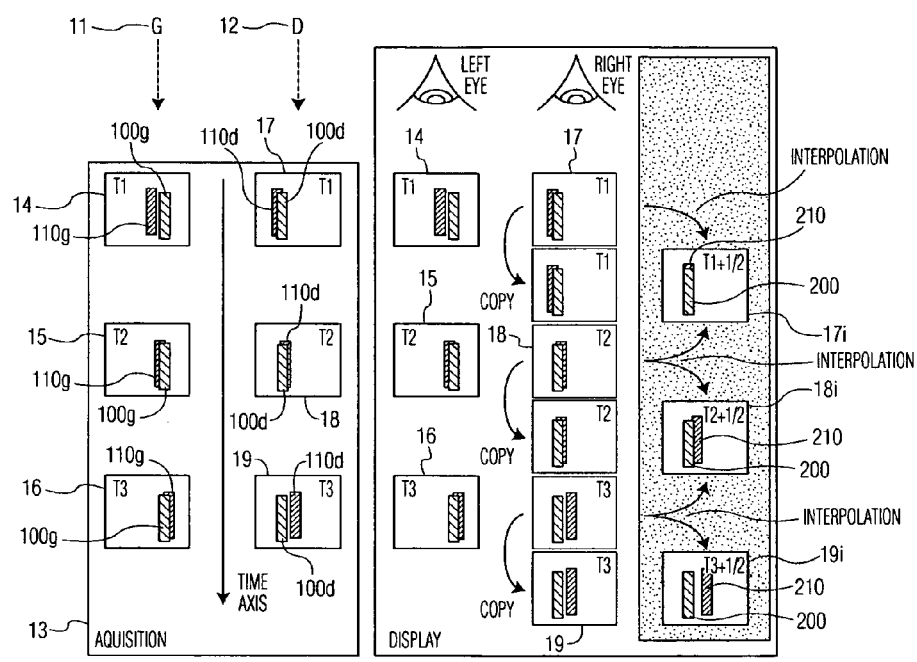
Figure 3:
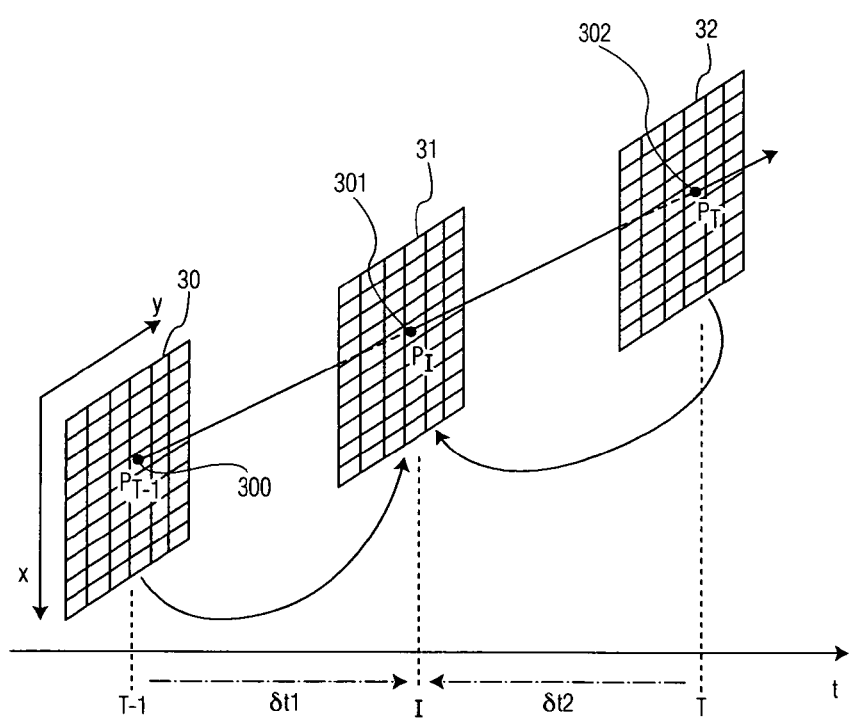
Figure 4A:
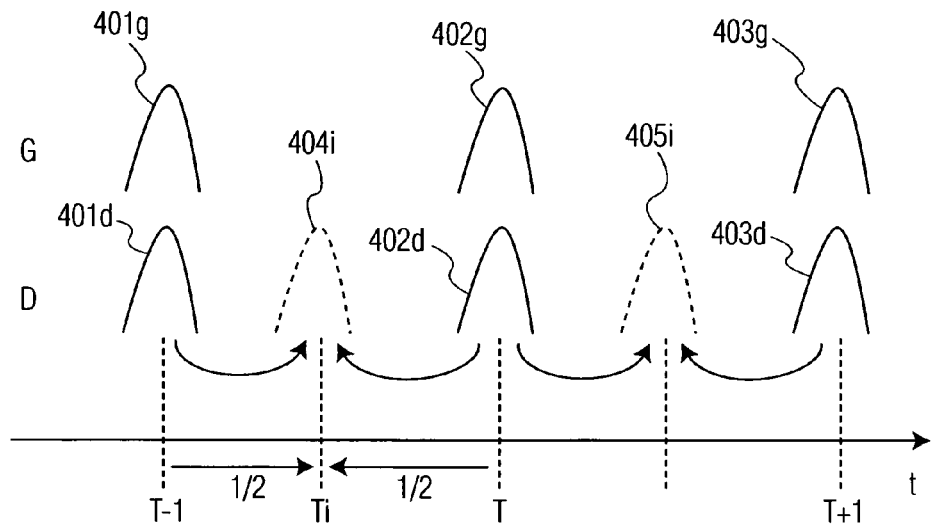
Figure 4B:
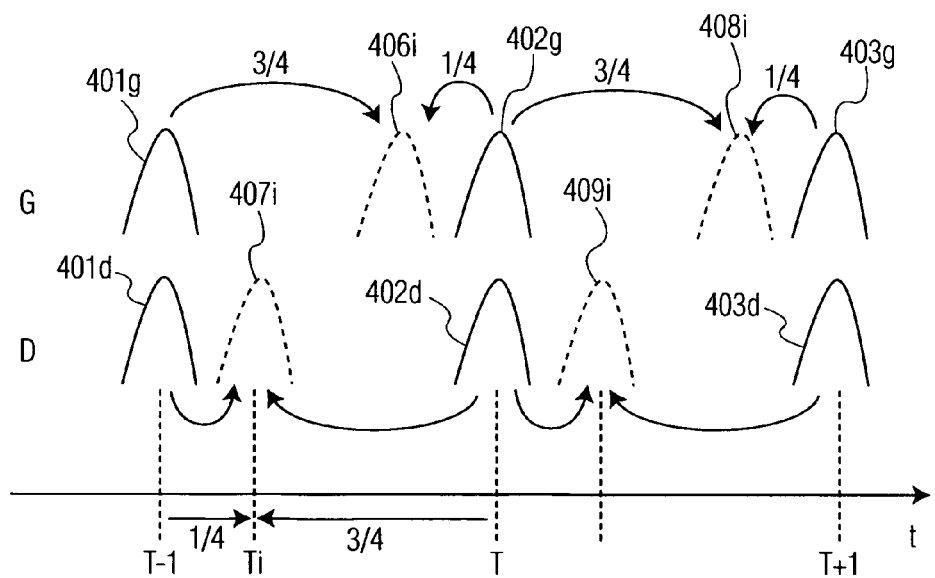
Figure 5:
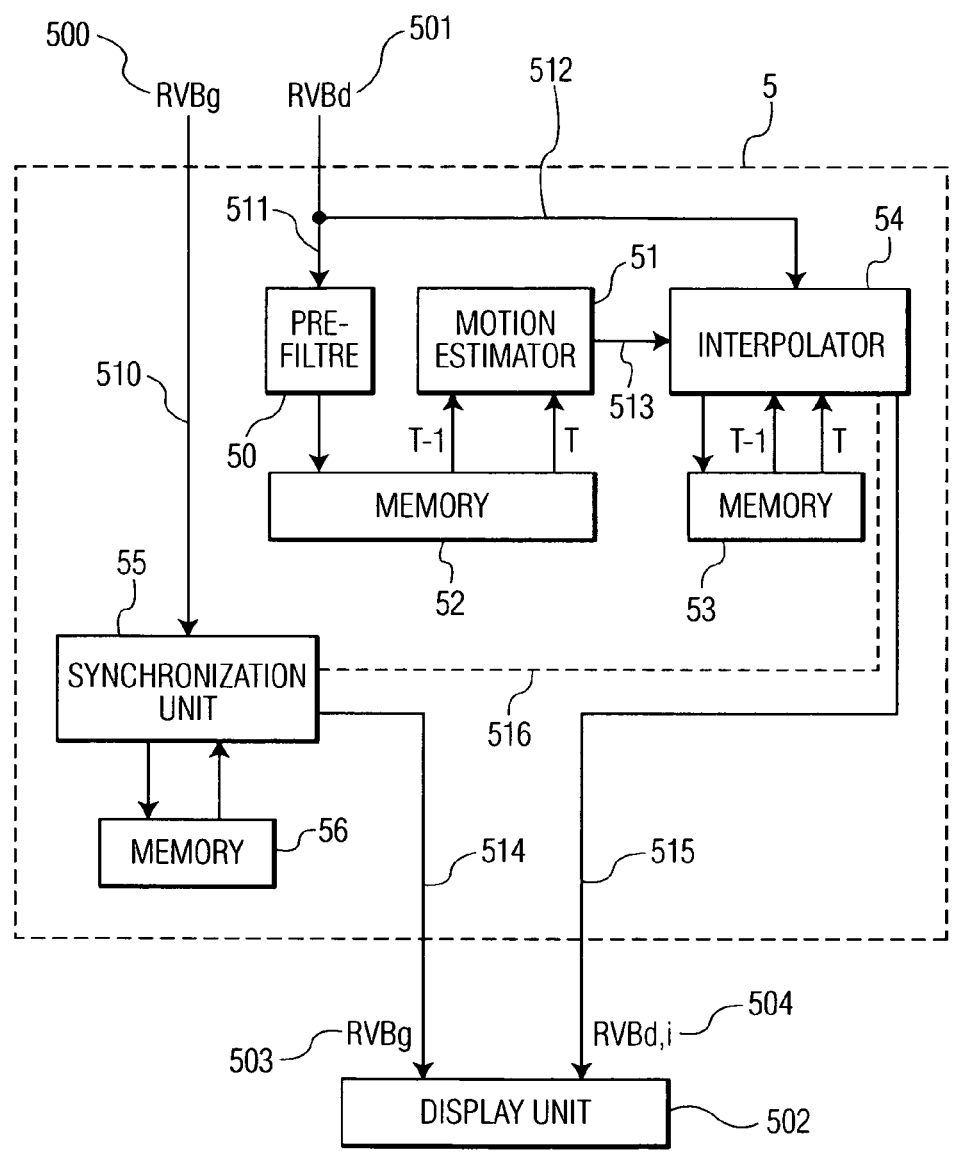
Figure 6:
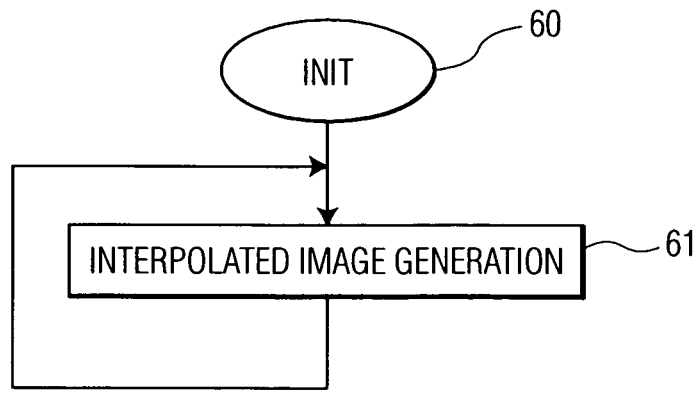
Figure 7:
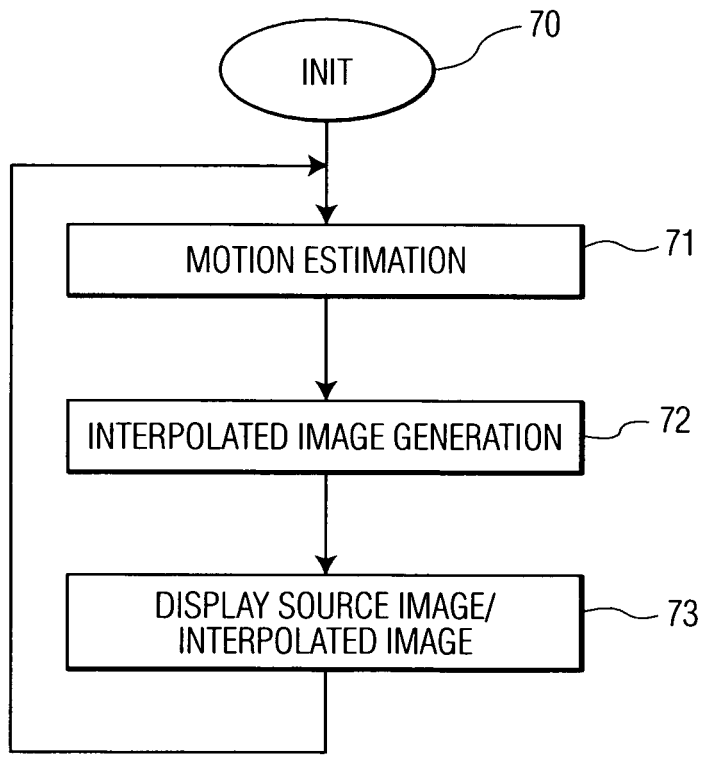

The invention will be better understood, and other specific features and advantages will emerge upon reading the following description, the description making reference to the annexed drawings wherein:

FIG. 1, described previously, shows the capture of images of a video sequence representative of a scene 10 by two recording devices, according to a particular embodiment of the prior art, FIG. 2 shows a method for temporal registration of images captured according to the method described in FIG. 1, according to an embodiment of the invention, FIG. 3 shows a method for temporal interpolation of images captured according to the method described in FIG. 1, according to a particular embodiment of the invention, FIGS. 4A and 4B show to two modes of temporal interpolation of images captured according to the method described in FIG. 1, according to two embodiments of the invention, FIG. 5 diagrammatically shows the structure of an image processing unit, according to a particular embodiment of the invention, and FIGS. 6 and 7 show a method for processing video images implemented in a processing unit of FIG. 5, according to two particular embodiments of the invention.

5. DETAILED DESCRIPTION OF EMBODIMENTS OF THE INVENTION

FIG. 2 shows a method for temporal registration of images captured as described in respect to FIG. 1, according to an embodiment of the invention. The elements of FIG. 2 that are identical to the elements of FIG. 1 keep the same references as those of FIG. 1. Two image acquisition devices, respectively left G 11 and right D 12, record an image sequence of a same scene according to two different viewpoints, respectively a left viewpoint and a right viewpoint. The result of these recordings is shown by the video sequence acquisition timing diagram 13. According to the implementation example of FIG. 2, the left video sequence comprises three successive left images 14, 15 and 16, each of these images being representative of a scene comprising two cylinders captured at times T1, T2 and T3 respectively and the right video sequence also comprises three successive right images 17, 18 and 19 representative of the same scene as the left images but captured according to another viewpoint than the left images, the three right images 17 to 19 being respectively captured at the times T1, T2 and T3. The images 14 and 17 are thus recorded in a synchronized way (that is to say at a same time) at the time T1, the images 15 and 18 are recorded in a synchronized way at the time T2 and the images 16 and 19 are recorded in a synchronized way at the time T3. Each pair of left and right images 14/17, 15/18 and 16/19 are suitable to form a stereoscopic image restoring a three-dimensional view of the recorded scene due to the spatial distance of the left and right acquisition devices 11 and 12 that record the same scene according to two different viewpoints. To restore the stereoscopic vision of the scene acquired by the acquisition devices 11 and 12 on a display device (for example a plasma display panel, an LCD (Liquid Crystal Display) screen), the captured left and right images are displayed sequentially in time according to the following schema: left image 14, right image 17, left image 15, right image 18, left image 16, right image 19 and so on. According to the example shown with regard to FIG. 2, the left images 17, 18 and 19 are displayed with a slight delay with respect to the right images 14, 15 and 16 respectively according to a method known to those skilled in the art called temporal sequential displaying. The display delay corresponds to the addressing period of the display device 20 and is for example 10 ms when the displaying frequency is of 100 Hz. The video sequence composed of left images is seen by the left eye of a spectator and the video sequence composed of right images is seen by the right eye of a spectator, the spectator having to wear adapted glasses that enable the occultation of left images for the right eye and occultation of right images for the left eye. The temporal deviation for the displaying of left and right images acquired in a synchronized way leads to a display defect of stereoscopic images characterized by a juddering of images, the defect appearing when the reproduced video sequences contain elements (for example objects, persons) in movement. To reduce, or eliminate this defect, a temporal registration of images displayed with a slight delay (or slight advance) is carried out. According to the example of FIG. 2, a video process is operated on the right video sequence. The temporal registration of the video sequence composed of right images 17, 18 and 19 is temporally interpolated, an interpolated video sequence composed of interpolated right images 17i, 18i and 19i being obtained. The interpolated right image 17i is obtained by temporal interpolation of images 17 and 18 of the source right video sequence, that is to say of the right video sequence acquired by the right acquisition device 12. The interpolated right image 18i is obtained by temporal interpolation of images 18 and 19 of the source right video sequence. The interpolated right image 19i is obtained by temporal interpolation of the image 19 and the image directly following the image 19 (not shown in FIG. 2) of the source right video sequence. Each interpolated image 17i to 19i comprises a representation of cylinders composing the acquired scene. The images 17i, 18i and 19i each comprise a representation 200 of the static cylinder and a representation 210 of the mobile cylinder at three different times, respectively T1+δt, T2+δt and T3+δt, δt corresponding to the temporal deviation between the preceding source image and the corresponding interpolated image, that is to say to the temporal deviation between the acquisition time of the source image in the source video sequence and the display time of the interpolated image in the corresponding displayed video sequence. To reduce or eliminate the display defects linked to the displaying of source images, the interpolation of right images is carried out with motion compensation. The interpolation with motion compensation enables the position of cylinders 200 and 210 to be determined at the time of display of the interpolated image, that is to say at T1+δt for the image 17i, at T2+δt for the image 18i and at T3+δt for the image 19i. The interpolation of the motion compensated image applied on the right video sequence thus enables interpolated images to be generated having a content corresponding to the deviated capture time of δt, that is to say deviated from the duration that there is between the displaying of left image and a right image on the display device, that does not correspond to the real capture time of the associated source image (that is to say of the source image 17 for the interpolated image 17i, of the source image 18 for the interpolated image 18i and of the source image 19 for the interpolated image 19i).

According to a variant, the left images 14 to 16 are displayed with a slight advance with respect to the right images 17 to 19 respectively. According to this variant, the motion compensated interpolation is carried out on the left video sequence comprising the left images.

According to another variant, the left images 14 to 16 are displayed with a slight delay with respect to the right images 17 to 19 respectively. According to this variant, the interpolation with motion compensation is carried out on the left video sequence comprising the left images.

According to another variant, the motion compensated interpolation is carried out on the left video sequence and on the right video sequence.

According to a variant, pairs of images 14 and 17, of images 15 and 18 and of images 16 and 19 are recorded in a synchronized way in comparison to a common clock, that is to say images 14 and 17 being able to be acquired with a given delay, images 15 and 18 being able to be acquired with the same given delay and images 16 and 19 being able to be acquired with the same given delay.

FIG. 3 shows a method for motion compensated interpolation of source images captured according to the method described with respect to FIGS. 1 and 2, according to a non-restrictive embodiment of the invention. The image I 31 to be interpolated is interpolated from two source images 30 and 32 of a source video sequence, the first 30 of these source images being called the preceding source image T−1 and the second 32 of these images being called the current source image T. The temporal deviation between the preceding source image T−1 30 and the image to be interpolated I 31 is equal to δt1 and the temporal deviation between the image to be interpolated I 31 and the current source image T 32 is equal to δt2. The motion compensated video interpolation advantageously comprises a step of motion estimation followed by a step of interpolation. The motion estimation consists in defining a motion vector for each of the points of the image to be interpolated I 31, said image is positioned temporally between the two source images T−1 30 and T 32. The motion estimation step is advantageously carried out in 2 steps: a step of prediction and a step of correction. The step of prediction consists in defining, for each of the pixels of the image to be interpolated I 31, a motion vector from motion vectors already calculated for neighbouring pixels and the projection of a motion vector calculated for the preceding source image T−1 30 and passing by the pixel considered of the image to be interpolated I 31. The motion vectors already calculated are for example those of the n neighbouring pixels of the preceding line of pixels. The prediction consists then in selecting, among the n+1 pre-calculated motion vectors, the motion vector generating the smallest DFD (Displacement Frame Difference) value. The step of correction consists then in rotating around its axis the motion vector selected to further reduce, if possible, the DFD of the pixel considered of the image to be interpolated I 31. The motion estimation is advantageously carried out for a number of the pixels of the image to be interpolated I 31, for example 25% of the totality of the pixels, or one pixel in four or 50% of the totality of pixels, or one pixel in two. According to a variant, the motion estimation is carried out for the set of pixels of the image to be interpolated I 31. According to another variant, the step of motion estimation is carried out in a single step.

The step of interpolation, that follows the step of motion estimation is advantageously a bilinear interpolation. In the case of the image to be interpolated I 31 between a preceding source image T−1 30 and a current source image T 32, the motion vector defined previously points to an image point of each of the source images, this image point being either a pixel, or a point situated between 4 pixels. In the case of a single frame interpolation, the bilinear interpolation then consists in assigning to the considered pixel $P_I$ 301 of the image to be interpolated a value that is a bilinear function f of values of 4 pixels pointed to in one of the source images (for example the current source image) by the estimated motion vector for the pixel $P_I$. For example, if $NV_1$, $NV_2$, $NV_3$ and $NV_4$ designate the values (for example their video level NV) of 4 pixels close to the point of the pointed to image $P_T$ 302 by the motion vector in the current source image T 32 and if $\alpha_1$, $\alpha_2$, $\alpha_3$ and $\alpha_4$ are weighting factors representative of the proximity of said pixels with the image point $P_T$, the value assigned to the pixel $P_I$ 301 of the image to be interpolated I 31 is $$\frac{\left(\sum_{i=1}^{4} \alpha_i \cdot NV_i\right)}{\sum_{i=1}^{4} \alpha_i}.$$

If the motion vector points to a particular pixel among the 4 pixels, the weighting factor assigned to the 3 other pixels is null and the value assigned to the pixel considered is the value of this particular pixel. In the case of a double frame interpolation, the bilinear interpolation is made in the same way but with 8 pixels, namely 4 pixels of the preceding source image and 4 pixels of the current source image. According to a variant, the source image pointed to by the motion vector (or its opposite) is the preceding source image T−1 30 and the image point pointed to is $P_{T-1}$ 300. According to a variant, the interpolation is carried out for example by temporal linear interpolation on a fixed area, by spatio-temporal filtering on the critical areas of the image (that is to say the areas for which the confidence of the motion vector is low) or by any method known to those skilled in the art. According to another variant, the interpolation is carried out by any combination of the methods cited previously.

According to a variant, the motion compensated interpolation is carried out in a single step.

FIGS. 4A and 4b show to two modes of temporal interpolation of source images captured according to the method described in respect to FIGS. 1 and 2, according to two particular embodiments of the invention.

FIG. 4A shows a first example of motion compensated temporal interpolation. In FIG. 4A, the peaks 401g, 402g and 403g in solid lines representing the source left images acquired by a left acquisition device. The left image 402g corresponds to an image called the current image T, the left image 401g has an image called preceding image T−1 and the left image 403g has an image called the following image T+1, the three left images 401g to 403g belonging to the left video sequence and being successive from a temporal viewpoint. The peaks 401d, 402d and 403d in solid lines represent the source right images acquired by a right acquisition device. The right image 402d corresponds to an image called the current image T, the right image 401d has an image called preceding image T−1 and the left image 403d has an image called the following image T+1, the three left images 401d to 403d belonging to the right video sequence and being successive from a temporal viewpoint. As shown in FIG. 4A, the left image 401g was acquired in a temporally synchronized way with the right image 401d, the left image 402g was acquired in a temporally synchronized way with the right image 402d and the left image 403g was acquired in a temporally synchronized way with the right image 403d. The peaks 404i and 405i in dotted lines represent interpolated right images from right images acquired by the acquisition device, also called source right images. The interpolated right image 404i is interpolated from source right images 401d and 402d and the interpolated right image 405i is interpolated from source right images 402d and 403d. According to the example of FIG. 4A, the interpolated right image 404i is situated at the midpoint from a temporal viewpoint from source right images 401d and 402d and the interpolated right image 405i is situated at the midpoint from a temporal viewpoint of source right images 402d and 403d. If the duration separating two source images, for example 401d and 402d, corresponds to a frame time T, the duration δt1 separating the source image 401d of the interpolated image 404i is equal to the duration δt2 separating the source image 402d from the interpolated image 404i and is equal to ½ frame time. In the same way, the following interpolated image 405i is separated temporally from each of the source right frames 402d and 403d surrounding the ½ frame time. This implementation example offers the advantage of carrying out the motion compensated temporal interpolation only on one of the two source video sequences, namely the right source video sequence. According to a variant, the motion compensated interpolation is carried out on the left source video sequence G and not on the right source video sequence D.

FIG. 4B shows a second example of motion compensated temporal interpolation. In FIG. 4B, the peaks 401g, 402g, 403g, 401d, 402d and 403d in solid lines represent the acquired left and right source images and are identical to those described with regard to FIG. 4A that has the same references. The peaks 406*i* and 408*i* in dotted lines represent interpolated left images, the interpolated image 406*i* being interpolated from left source images 401*g* and 402*g* and the interpolated image 408*i* being interpolated from left source images 402*g* and 403*g*. According to this example, the duration separating the left source image 401*g* from the interpolated image 406*i* is equal to ¾ of the frame time and the duration separating the interpolated image 406*l* from the current left source image 402*g* is equal to ¼ of the frame time. The interpolated image 406*i* is temporally closer to the current left source image 402*g* than the preceding left source image 401*g*, that is to say three times closer temporally. In the same way, the duration separating the current left source image 402*g* from the interpolated image 408*i* is equal to ¾ of the frame time and the duration separating the interpolated image 408*i* from the following left source image 403*g* is equal to % of the frame time. The interpolated image 408*i* is temporally closer to the following left source image 403*g* than the current left source image 402*g*, that is to say three times closer temporally. The peaks 406*i* and 408*i* in dotted lines represent interpolated left images, the interpolated image 406*i* being interpolated from left source images 401*g* and 402*g* and the interpolated image 408*i* being interpolated from left source images 402*g* and 403*g*. According to this example, the duration separating the preceding right source image 401*d* from the interpolated image 407*i* is equal to ¾ of the frame time and the duration separating the interpolated image 407*i* from the current right source image 402*d* is equal to ¾ of the frame time. The right interpolated image 407*i* is temporally closer to the preceding right source image 401*d* than the current right source image 402*d*, that is to say three times closer temporally. In the same way, the duration separating the current right source image 402*gd* from the right interpolated image 409*i* is equal to ¼ of the frame time and the duration separating the right interpolated image 409*i* from the following right source image 403*d* is equal to ¾ of the frame time. The interpolated image 409*i* is temporally closer to the current right source image 402*d* than the following right source image 403*d*, that is to say three times closer temporally. Whether for the example shown in FIG. 4A or for the example shown in FIG. 4B, the temporal difference at the display level between a left image (source for FIG. 4A, interpolated for FIG. 4B) and a right image (interpolated for FIGS. 4A and 4B) is constant and equal to ½. This implementation example offers the advantage of minimizing the errors linked to motion compensated temporal interpolation, the interpolated image being temporally close to a source image (that is to say ¼ frame).

According to a variant, several interpolated images are generated between two source images, for example 2, 3 or 4 interpolated images. The generation of several interpolated images between two source images enabling the number of images for display to be multiplied and as a consequence increasing the display frequency of images on the display device. According to this variant, the source and interpolated images are advantageously distributed uniformly from a temporal viewpoint, that is to say the duration that separates them is identical for all the images.

FIG. 5 diagrammatically shows a hardware embodiment of a processing unit 5 of a display device, according to a particular embodiment of the invention. The processing unit 5 takes for example the form of a programmable logical circuit of type FPGA (Field-Programmable Gate Array) for example, ASIC (Application-Specific Integrated Circuit) or a DSP (Digital Signal Processor). The processing unit is adapted for the implementation of the method described previously.

The processing unit 5 comprises the following elements:
a pre-filter 50,
a motion estimator 51,
memories 52, 53 and 56, for example of type RAM (Random Access Memory) or flash, able to memorize one or several source images,
an interpolator 54,
a synchronization unit 55,
data buses 510, 511, 512, 513, 514 and 515, and
a clock bus 516.

A first signal RVBd (Red, Green, Blue right) 501 representative of the right source video sequence comprising right source images acquired by the right acquisition device is supplied at the input to the processing unit 5 to a pre-filter 50 via a data bus 511. The pre-filter 50 filters the pixels composing the right source images, that is to say a current source image T and a preceding source image T−1, while determining by calculation for example a pixel for four pixels of the source image or a pixel for two pixels of the source image according to a determined spatial schema, to store a number of the pixels of each of the current source images T and preceding images T−1 in the memory 52. The motion estimator 51 determines a motion vector (Vx, Vy) for each pixel of the image to be interpolated, each of the pixels for which a motion vector is determined being associated with several pixels (4 or 2 according to the examples given above) of current source images T and preceding source images T−1 stored in the memory 52. A same motion vector (Vx, Vy) is associated with several pixels of source images T and T−1. These determined motion vectors (Vx, Vy) are transmitted to the interpolator 513 via the data bus 513. In parallel, the interpolator 54 receives at input the signal RVBd 501 representative of current right source images T and preceding right source images T−1, the video levels of each of the pixels of each of the current images T and preceding images T−1 being stored in the memory 53. The interpolator 54 generates an interpolated right image from current right source images T and preceding right source image T−1 and associated motion vectors (Vx, Vy). The signal RVBd,i (for Red, Green, Blue right interpolated) representative of interpolated right images from the source right video sequence is transmitted to a display unit 502, advantageously external to the processing unit 5, via the data bus 515 for displaying an interpolated right video sequence comprising the interpolated right images. The interpolated right video sequence is composed of right images interpolated in motion that replace the source right images comprised in the source right video sequence. Thus, the right images displayed on the display device are interpolated right images and not source right images. A video processing having been operated on the source right video sequence, a delay is generated at the transmission level of interpolated images at the display device 502 with respect to the associated left images for which the content corresponds to each of the interpolated right images. To synchronize the transmission of the signal RVBg (for Red, Green, Blue left) 500 at the display unit 502 with the signal RVBd,i 504, the signal RVBg 500 is delayed by memorization of one or more left images in a memory 56 through the intermediary of a synchronization unit 55, the signal RVBg 500 being supplied to the synchronization unit 55 via the data bus 510. The synchronization unit 55 also transmits a clock signal 54 to the interpolator 54 via the clock bus 516 to trigger the transmission of an interpolated right image to the display unit 502 in such a way that the interpolated right image is received by the display unit just after the left image for which the content corresponds to the interpolated right image in order to generate a stereoscopic image from a pair of images comprising an associated interpolated left image and right image. The left image of the pair of images intended to form a stereoscopic image is transmitted by the synchronization unit 55 to a display unit 502 via a data bus 514.

According to a variant, the processing unit 5 does not comprise decimation of source images, that is to say that the motion estimation is carried out for all the pixels composing the preceding source images T−1 and current source images T. According to this variant, the pre-filter is functionally less complex (only carrying out for example Gaussien smoothing of source images) than when a pixel is determined for several pixels of source images. According to this variant, the memory 52 only stores a single image, namely the preceding image, the current image being directly transmitted to the motion estimator without being memorized beforehand. In the same way, the memory 53 only stores a single image, namely the preceding image, the interpolation being carried out from the current image received by the interpolator and the memorized preceding image. After interpolation, the current image becomes the preceding image of a new current image and is stored in the memory 53 overwriting the old preceding image.

According to another variant the memories 52 and 53 form only a single memory.

According to another variant, the signal RVBg representative of the left source video sequence is also interpolated with motion compensation. According to this variant, the processing unit 5 comprises a second pre-filter, a second motion estimator, a second interpolator with the associated memories for the interpolation with motion compensation of left images in addition to the pre-filter 50, the motion estimator 51, the interpolator 54 and their associated memories 52 and 53 intended for interpolation of right images. The functioning of second pre-filters, motion estimators and interpolators is identical to that described previously for the processing of right images.

FIG. 6 shows a method for processing video images implemented in a processing unit 5, according to a non-restrictive particularly advantageous embodiment of the invention.

During an initialisation step 60, the different parameters of the processing unit are updated.

Then, during a step 61, an image is interpolated from two source images of a video sequence, the video sequence resulting from the combination of two video sequences, called the left video sequence and the right video sequence, the left and right video sequences comprising respectively left images and right images of a same scene filmed respectively by a left camera and a right camera in a synchronized way. The video sequence resulting from the combination of left and right video sequences is composed of left and right images of left and right video sequences temporally succeeding each other alternately, that is to say the left and right images are temporally alternated in the following manner: left image, right image, left image, right image, left image and so on and so forth. In other words, the video sequence resulting from the combination of left and right video sequences comprises a plurality of left and right image pairs that succeed each other temporally, each pair of images comprising a left image and a right image representative of the same scene captured at the same time T. Each image pair is intended to generate a stereoscopic image, that is to say an image in three dimensions, of the scene. The left image of a pair of images is also called the first image, the right image of a pair of images is also called the second image and the video sequence resulting from the combination of left and right video sequences is called the first video sequence in the remainder of the description. The interpolated image, also called the third image, is advantageously interpolated with motion compensation from two second images temporally succeeding in the first video sequence. The third image is temporally interposed between the two second images. The temporal interval separating the second image preceding (from a temporal viewpoint) the third image of the third image is equal to δt1 and the temporal interval separating the second image following (from a temporal viewpoint) the third image of the third image is equal to δt2. Advantageously, δt1 is equal to δt2.

According to a variant, several third images are interpolated with motion compensation from two second images, notably to increase the frequency of images of the first video sequence.

According to another variant, the third image or third images is (are) interpolated from two left image temporally following one another. According to this variant, the left image of an image pair is called the second image and the right image of an image pair is called the first image to conserve the same vocabulary as above.

According to another variant, the third image is interpolated with motion compensation from two right images, called second images, and a fourth image result of the interpolation with motion compensation of two left images, called first images. According to this variant, the temporal interval separating the first image preceding (from a temporal viewpoint) the fourth image of the fourth image is equal to δt1' and the temporal interval separating the first image following (from a temporal viewpoint) the fourth image of the fourth image is equal to δt2'. According to this variant, δt1 is advantageously strictly less than δt2, that is to say that the third image is temporally closer than the second image that precedes it an δt1' is strictly greater than δt2', that is to say that the fourth image is temporally closer to the first image that follows it and the temporal interval separating the third image from the fourth image is equal to half of the time separating two first images in the left video sequence (that is to say that captured by an acquisition device).

The interpolation with motion compensation of the third image and/or the fourth image is advantageously reiterated in a way to replace all the second images of the first video sequence with interpolated images, that is to say third images, and/or to replace all the first images of the first video sequence with interpolated images, that is to say fourth images.

FIG. 7 shows a method for processing video images implemented in a processing unit 5, according to a non-restrictive particularly advantageous embodiment of the invention.

During an initialisation step 70, the different parameters of the processing unit are updated.

Then, during a step 71, a motion vector is calculated for each pixel of a number of pixels of the image to be interpolated, that is to say the third image and/or the fourth image, for example for one pixel in two or for one pixel in four. According to a variant, a motion vector is determined for each pixel of the image. For the third image, the motion vectors are determined from two second images and for the fourth image, the motion vectors are determined from two first images.

Then, during a step 72, the third image and/or the fourth image is (are) interpolated from two second images (respectively from two first images) and from motion vectors determined in step 71. When a motion vector has been determined for only a number of pixels of the third image, for example for one pixel in four, the motion vector calculated for the pixel among the four is copied for the three other pixels in a way to carry out the interpolation for the set of pixels of the image to be interpolated, that is to say of the third image. For the remainder, step 72 is identical to step 61 described with regard to FIG. 6.

Finally, during a step 73, the first and third images are displayed on a display device in a temporal sequential manner, that is to say successively and alternated as a first image followed by a third image and so on and so forth. The displaying of third images interpolated with motion compensation instead of original second images enables the defect linked to an offset display of a second image with respect to the first image that is associated with it (that is to say captured at the same instant T) to be corrected, the display of the second image following the display of the first image. In fact, the third image replacing the second image having been temporally registered (by temporal interpolation with motion compensation), the temporal positioning of the third image in the video sequence displayed on the display device is coherent with its motion compensated content. According to a variant, the fourth images and the third images are displayed on a display device in a temporal sequential manner, that is to say successively and alternated as a fourth image followed by a third image and so on and so forth.

Naturally, the invention is not limited to the embodiments previously described.

In particular, the invention is not restricted to a method for processing images but extends to the processing unit implementing such a method and to the display device comprising a processing unit implementing the image processing method.

Advantageously, each left and right video sequence comprises more than three images. The number of images depends on the duration of video sequences (for example acquired at 50 or 60 Hz in video mode, that is to say 50 or 60 images per second, or at 24 Hz in film mode, that is to say 24 images per second).

The invention claimed is:

1. A method of video processing of a sequence of stereoscopic image pairs, each stereoscopic image pair comprising a first image and a second image acquired in a synchronized way, each first image being a left image and each second image being a right image, wherein said method comprises
   generating at least a third image by motion compensated temporal interpolation from at least two second images, the at least a third image being generated from two second images immediately successive in temporal order, a first temporal interval separating the third image from the second image temporally preceding the third image, a second temporal interval separating the third image from the second image temporally following the third image, the first temporal interval being strictly less than the second temporal interval;
   generating at least a fourth image by motion compensated temporal interpolation from at least two first images, the at least a fourth image being generated from two first images immediately successive in temporal order, a third temporal interval separating the fourth image from the first image temporally preceding the fourth image, a fourth temporal interval separating the fourth image from the first image temporally following the fourth image, the fourth temporal interval being strictly less than the third temporal interval;
   the second image temporally preceding the third image and the first image temporally preceding the fourth image forming a first stereoscopic image pair of said sequence, the second image temporally following the third image and the first image temporally following the fourth image forming a second stereoscopic image pair of said sequence.

2. The method according to claim 1, further comprising estimating a motion vector for each pixel of a plurality of pixels of said third image from said at least two second images.

3. The method according to claim 1, wherein it further comprising displaying of said first and third images on a displaying device, said first and third images being respectively displayed sequentially.

4. The method according to claim 1, further comprising displaying ef said third and fourth images on a display device, said third and fourth images being respectively displayed sequentially.

5. The method according to claim 1, wherein the first temporal interval and the fourth temporal interval are equal and wherein the second temporal interval and the third temporal interval are equal.

6. The method according to claim 1, wherein a plurality of third images are generated from two second images immediately successive from a temporal viewpoint and wherein a same plurality of fourth images is generated from two first images immediately successive from a temporal viewpoint.

7. The method according to claim 6, wherein the third images forming said plurality are distributed uniformly from a temporal viewpoint between said two second images and wherein the fourth images forming said plurality are temporally distributed between said two first images in the same way as the third images.

8. A device configured for processing a sequence of stereoscopic image pairs, each stereoscopic image pair comprising a first image and a second image acquired in a synchronized way, each first image being a left image and each second image being a right image, wherein said device comprises at least a processor configured for:
   generating at least a third image by motion compensated temporal interpolation from at least two second images, the at least a third image being generated from two second images immediately successive in temporal order, a first temporal interval separating the third image from the second image temporally preceding the third image, a second temporal interval separating the third image from the second image temporally following the third image, the first temporal interval being strictly less than the second temporal interval;
   generating at least a fourth image by motion compensated temporal interpolation from at least two first images, the at least a fourth image being generated from two first images immediately successive in temporal order, a third temporal interval separating the fourth image from the first image temporally preceding the fourth image, a fourth temporal interval separating the fourth image from the first image temporally following the fourth image, the fourth temporal interval being strictly less than the third temporal interval;
   the second image temporally preceding the third image and the first image temporally preceding the fourth image forming a first stereoscopic image pair of said sequence, the second image temporally following the third image and the first image temporally following the fourth image forming a second stereoscopic image pair of said sequence.

9. The device according to claim 8, wherein the at least a processor is further configured for estimating a motion vector for each pixel of a plurality of pixels of said third image from said at least two second images.

10. The device according to claim 8, wherein the at least a processor is further configured for displaying said first and third images on a displaying device, said first and third images being respectively displayed sequentially.

11. The device according to claim 8, wherein the at least a processor is further configured for displaying said third and fourth images on a display device, said third and fourth images being respectively displayed sequentially.

12. The device according to claim 8, wherein the first temporal interval and the fourth temporal interval are equal and wherein the second temporal interval and the third temporal interval are equal.

13. The device according to claim 8, wherein a plurality of third images are generated from two second images immediately successive from a temporal viewpoint and wherein a same plurality of fourth images is generated from two first images immediately successive from a temporal viewpoint.

14. The device according to claim 13, wherein the third images forming said plurality are distributed uniformly from a temporal viewpoint between said two second images and wherein the fourth images forming said plurality are temporally distributed between said two first images in the same way as the third images.

\* \* \* \* \*